3,329,185
POWER DRIVEN DEVICE FOR TIGHTENING AND
LOOSENING OF SCREWS OR THE LIKE
Alfred Hettich, Echterdingen, and Kurt Paule, Stuttgart-Berturkheim, Germany, assignors to Robert Bosch GmbH, Stuttgart, Germany
Filed Oct. 23, 1965, Ser. No. 502,989
Claims priority, application Germany, Oct. 24, 1964,
B 79,046
10 Claims. (Cl. 144—32)

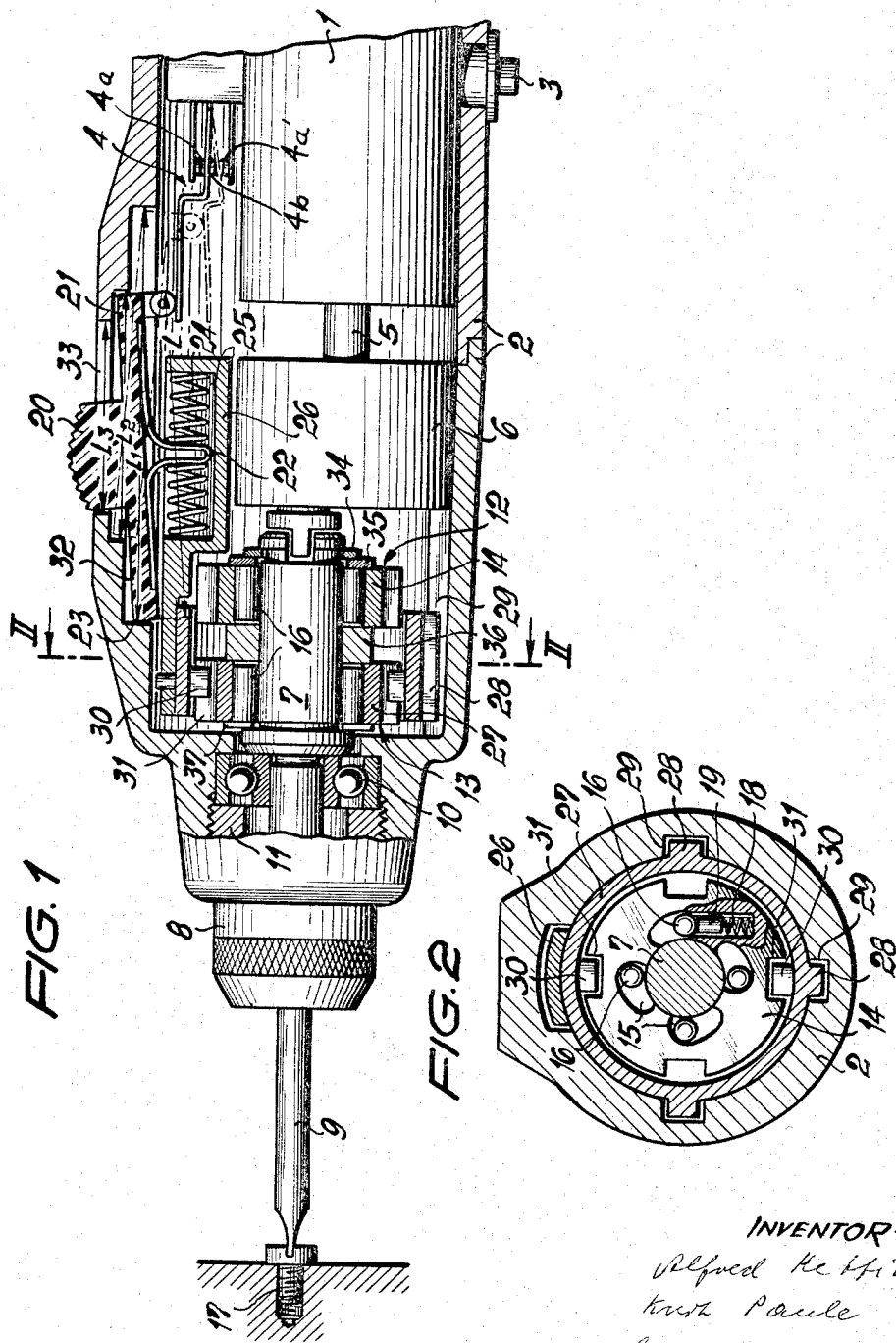

The present invention relates to a power driven device for tightening and loosening of screws and the like. More specifically the present invention relates to a power driven device in which a spindle coupled to a motor carries at its end facing away from the motor a tool preferably removably connected thereto and in which the spindle and the tool carried thereby may be manually turned by means of the housing in which the motor and spindle are mounted, when the motor is at a standstill and the tool engages a screw or the like.

In order to tighten a screw respectively or in order to loosen a tightened screw, it is necessary to apply to the spindle carrying the tool an increased turning moment. If this increased turning moment should be produced by the motor, the dimensions of the latter would have to be increased to such an extent so that the device would become rather heavy and difficult to handle.

One has tried already to overcome this difficulty by providing between the motor and the spindle a flywheel with a slip clutch, however, this arrangement has not worked out very satisfactorily, since the motor in this arrangement starts very slowly due to the additional weight of the flywheel which is to be accelerated so that a relatively long time is required for properly tightening or loosening a screw with this arrangement. Furthermore, such an arrangement is not suitable for loosening a screw, and in addition the operator cannot properly control the tightening movement, which especially during tightening of small screws may easily lead to a damage of the same.

Further attempts to improve motor driven tools for tightening or loosening of screws or the like have led to a construction in which the necessary increased turning moment for tightening a screw respectively or for loosening a tight screw connection is produced manually and in which only the relatively easy turning of the screw at the start of the tightening or at the end of the loosening operation is performed by the motor. This is accomplished in a known device in which a ratchet is coordinated with a spindle and in which during running of the motor the ratchet is disconnected from the spindle and when the motor is stopped it is brought into engagement with the spindle so that the spindle may be turned relative to the housing while the motor is running and be non-rotatably connected to the housing when the motor is at standstill. The known arrangement, however, has the disadvantage that when the motor is stopped while the spindle runs without load, the spindle will be abruptly stopped, whereby after extended use the ratchet as well as the mechanism to switch the motor on and off may be damaged. Furthermore, there exists also the danger, especially with relatively heavy motors that the jolt produced under the above conditions will pull the device from the hand of the operator.

It is one object of the present invention to provide for a power driven device for tightening and loosening screws or the like by means of which an increased turning moment can be manually produced and which avoids the above disadvantages of devices of this type known in the art.

It is an additional object of the present invention to provide for a device of the above type which is constructed of relatively few and simple parts so that the device may be produced at relatively low cost and so that the device will stand up perfectly under extended use.

With these objects in view, the power driven device for tightening and loosening screws or the like according to the present invention mainly comprises a housing, a motor mounted in the housing and having a drive shaft, a spindle operatively connected at one end thereof to the drive shaft of the motor for rotation therewith and adapted to carry at the other end thereof a tool, and coupling means for coupling the spindle to the housing non-rotatable with respect thereto when the motor is at standstill and the tool carried by the spindle engages a screw or the like, in which the coupling means are constructed and arranged to couple the housing to the spindle when the housing is turned in one direction in which the screw engaged by the tool is tightened and to uncouple the housing from the spindle during turning of the housing in the direction opposite to said one direction and also when the spindle is rotated by the motor in a direction in which the tool carried by the spindle is rotated in a screw tightening direction, whereby a screw engaged by the tool may first be driven in fast by rotating the spindle and the tool carried thereby by the motor and then the motor be stopped and the screw be tightened by manually turning the housing in said one direction and by turning thereby the spindle coupled thereto and the tool carried by the spindle in said one direction.

The novel features which are considered as characteristic for the invention are set forth in particular in the appended claims. The invention itself, however, both as to its construction and its methods of operation, together with additional objects and advantages thereof, will be best understood from the following description of specific embodiments when read in connection with the accompanying drawings, in which:

FIG. 1 is a partial, partially sectioned side view of the device according to the present invention; and FIG. 2 is a section of FIG. 1 taken along the line II—II of FIG. 1.

Referring now to the drawing, and more specifically to FIG. 1, it will be seen that the power driven device for tightening and loosening screws or the like according to the present invention comprises an electromotor 1 mounted in an elongated hollow housing 2. A switch 3 of known construction having a pushbutton projecting beyond the housing is operatively connected to the motor 1 for switching the latter on and off and change contacts means 4 are operatively connected to the motor 1 for changing the direction of rotation thereof. The contact means 4 comprise a pair of spaced contacts 4a and 4a' respectively connected to opposite ends of the field winding of the motor and a movable contact 4b intermediate the spaced contacts and connected to one pole of a current supply and adapted to be brought in contact with either of the spaced contacts to reverse thereby the direction of rotation of the motor. The motor 1 when energized drives over its drive shaft 5 and a schematically indicated reduction gearing 6, a spindle 7 which carries at its free end a chuck 8 in which tool 9 is fixed coaxially with the spindle 7, which may be for instance, as shown in the drawing, a screwdriver blade. If it is considered necessary, a slip clutch, not shown in the drawing, may be provided between the electromotor 1 and the spindle 7 to prevent overload of the motor 1.

The spindle 7 is turnably mounted in the housing 2 by means of a ball bearing 10 pressed against an internal shoulder in the housing by means of a hollow nut 11 threaded into a correspondingly threaded bore formed in the lower end of the housing. The spindle 7 and the housing 2 are adapted to be coupled to each other in such a manner that when the motor 1 is at a standstill and the tool 9 is engaged, the spindle 7 and the tool 9 connected thereto may be turned by turning the housing 2 by hand in the direction in which the screw is tightened while during turning of the housing in the opposite direction, the housing will be uncoupled from the spindle. In the arrangement illustrated in the drawing in which the direction of rotation of the motor 1 may be reversed so that the latter may either rotate in clockwise or in counterclockwise direction two free-wheel couplings 12 and 13 are provided which are free wheeling in opposite directions and one of the free-wheel couplings cooperates with the spindle during rotation of the motor in one direction and the other during rotation of the motor in the opposite direction.

Each of the free-wheel couplings 12 and 13 comprises a substantially disc-shaped annular coupling member 14 (FIG. 2) freely turnably mounted on the spindle 7 and formed at the inner periphery of the coupling member with a plurality of elongated cutouts 15 extending in circumferential direction and spaced from each other from the inner periphery of the coupling member 14 into the latter and each decreasing in width from one to the other end thereof. A rolling element 16 is located in each of the cutouts 15 and this rolling element has a diameter smaller than the maximum width of the cutout, but greater than the minimum width thereof so that the rolling element may freely rotate when located at the end of the cutout having the maximum width, while the coupling element 14 will be clamped to the spindle 7 by the rolling elements 16 when the latter are at the ends of the cutouts 15 of minimum width. The cutouts 15 in the coupling element 14 of the free-wheel coupling 12 taper in opposite direction to the cutouts in the coupling elements of the free-wheel coupling 13.

If the device of the present invention is provided with an electric motor which cannot be reversed, then only one free-wheel coupling is provided, and if the motor when energized rotates for instance is clockwise direction, the cutouts 15 may be tapered in the direction as shown in FIG. 2 so that during drive of the spindle by the motor in clockwise direction the rolling elements 16 engaged by the peripheral surface of the spindle 7 will be moved into position as shown in FIG. 2 so that the spindle may freely rotate with respect to the coupling element 14, while when the motor is stopped and the housing 2 turned by hand also in clockwise direction, the rolling elements 16 will be pushed by the bolts 19 and the action of the compression springs 18 engaging the bolts to the ends of the cutouts 15 of small width so that the coupling element 14 will be clamped to the spindle. In such an arrangement in which the motor is driven only in one direction, the coupling element 14 of the single free wheel coupling may be fixedly connected to the housing 2 for rotation therewith.

In the arrangement illustrated in the drawing, in which the direction of rotation of the motor 1 may be reversed, it is necessary to provide two free-wheel couplings 12 and 13 which differ from each other in that the cutouts 15 which receive the rolling elements 16 are respectively tapered in opposite directions and the coupling elements 14 are operatively connected to a switch member 20, longitudinally movably arranged in the housing 2 and serving during movement between two end positions thereof to reverse the direction of rotation of the motor 1, in such a manner that a respective one of the coupling elements 14 of the free-wheel couplings 12 and 13 is non-rotatably connected to the housing 2 when the motor rotates in the one or in the other direction. The switch member 20 is in a manner as will be described in detail on movable in longitudinal direction of the housing 2 and tiltable slightly with respect thereto. The switch member 20 has a pair of arms 21 and 32 extending opposite to each other substantially in longitudinal direction of the housing and the upper arm 21 engages with an inwardly projecting free end thereof an extension of the contact 4b to move the latter during tilting of the switch member from the position shown in FIG. 1 into contact with the contact 4a'. An operating member 22 projects substantially normal to the elongation of the switch member 20 from the inner face thereof. The operating member 22 is constituted by a U-shaped portion of an elongated leaf spring 23 having a pair of end portions located substantially in a plane and being fixed to the switch member 20 at a face thereof directed to the axis of the spindle 7. The operating member 22 constituted by the U-shaped projecting portion of the leaf spring 23 projects between two adjacent convolutions of a coil spring 24 extending longitudinally through an elonagted cavity 25 formed in a slide member 26 which is mounted in the housing 2 for movement in longitudinal direction and fixedly connected at the lower end thereof to a ring 27 surrounding the coupling members 12 and 13 and movable in axial direction. The ring 27 is provided at the outer periphery thereof with at least 1, or as shown in FIG. 2, with 3 elongated ribs 28 extending in axial direction of the ring 27 and being respectively engaged in corresponding elongated grooves 29 formed at the inner surface of the housing 2, so that the ring 27 may slide in axial direction with respect to the housing while being prevented from turning relative thereto. Each rib 28 and its corresponding groove 29 form therefore a first pair of cooperating engaging means for preventing turning of the ring 27 relative to the housing 2. The ring 27 is further provided with a pair of projections 30 arranged opposite from each other and projecting inwardly from the inner surface of the ring. Each of the coupling elements 14 is provided with at least one pair of oppositely arranged grooves 31 or, as shown in FIG. 2, with two pairs of oppositely arranged grooves 31 and the projections 30 engage in one of the pair of grooves 31 of the coupling element 14 of the free wheel coupling 13 when the ring 27 is in the position as shown in FIG. 1, while the projections 30 of the ring 27 will engage into the groove 31 of the coupling elements 14 of the upper free-wheel coupling 12 when the ring 27 is shifted from the position shown in FIG. 1 in upward direction during moving of the switch member 20 and the slide member 26 connected thereto in upwardly direction, whereby the rotation of the electromotor is reversed. Each groove 31 constitutes a first additional engaging means and each projection 30 a second additional engaging means.

In order to arrest the switch member 20 in either of its end positions, the housing 2 is formed at a wall portion thereof with a stepped opening 33, decreasing in length in three steps from the inner to the outer surface of the aforementioned wall portion of the housing. As shown in FIG. 1, the innermost step of the stepped opening 33 has a length $L_1$, the intermediate step has a length $L_2$, and the outer step of the opening has a length $L_3$. The overall length of the switch member 20 between the end faces of the arms 21 and 32 thereof is substantially equal to half of the length $L_1$ of the innermost step plus half of the length $L_2$ of the intermediate step so that in the end position as shown in FIG. 1 the end face of the downwardly directed arm 32 will abut against the lower end face of the innermost step of the opening 33 whereas the end face of the upwardly extending arm 21 will abut against the upper end face of the intermediate step. The switch member 20 may be shifted from the position shown in FIG. 1 to its other end position by pressing the portion of the switch member 20 projecting outwardly through the opening 33 inwardly and upwardly and in the other end position the end face of the lower arm 32 will abut against the lower end face of the intermediate step and the end face of the upper arm 21 will abut against the upper end face of the innermost step of the stepped opening 33. In this way, the switch member 20 will be arrested in both of its end positions thereof.

During shifting of the switch member in the longitudinal direction the convolutions of the coil spring 24 respectively located at opposite sides of the operating member 22 will be stressed so that when during shifting of the ring 27 the projections 30 thereof should not be properly aligned with the corresponding grooves in the respective coupling member 14, the projections 30 will snap into the grooves 31 under the action of the spring 24, when the projections 30 on the ring 27 are brought into alignment with the respective groove 31 in the respective coupling element 14 during turning of the latter by turning the housing 2 about its axis. Spacer discs 34, 35, 36 and 37 are preferably provided at opposite ends and between the free-wheel couplings 12 and 13 for holding the coupling 12 and 13 in proper axial position on the spindle 7.

The arrangement above described will operate as follows:

In the position shown in FIGS. 1 and 2 it is assumed that the motor 1 when energized will rotate in clockwise direction and thereby the spindle 7 may rotate freely with respect to the coupling element 14 of the lower free-wheel clutch 13, since the rolling elements 16 in the cutouts 15 of the coupling element 14 of the lower free-wheel clutch will be located in the position as shown in FIG. 2. The screwdriver blade 9 engaging the head of a screw 17 may therefore be used for starting the inward drive of the screw. When the necessary turning moment for tightening the screw 17 increases beyond the turning moment provided by the motor 1, the motor 1 is stopped by means of the switch 3 and the housing 2 is then turned by hand also in clockwise direction whereby the rolling elements 16 will be pushed under the action of the springs 18 into the ends of cutouts 15 of small width so as to clamp the coupling element 14 of the lower clutch 13 to the spindle 7 and so that the spindle may be manually turned through the coupling element 14 of the lower clutch, the ring 27 connected to this coupling element by means of the projections 30 engaging the grooves 31 and by means of the housing 2 connected to the ring by means of the ribs 28 engaged in the grooves 29 of the housing. When the screw 17 is to be loosened the switch member 20 is shifted to its upper end position whereby the motor 1 is still switched off so that the upper free-wheel coupling 12 having cutouts 15 tapering in the opposite direction couples the spindle 7 to the housing 1 when the latter is turned in counter-clockwise direction providing thereby the increased turning movement for loosening the screw, and when the screw is loosened the motor may be switched on by means of the switch 3 to rotate thereby the spindle 7 and the tool connected thereto also in counter-clockwise direction for further unscrewing the screw 17, whereby during turning of the motor in this counter-clockwise direction the rolling elements 16 of the coupling elements 14 of the upper free wheel coupling 12 will be moved to the wide ends of the cutouts so that the spindle may be rotated by the motor in this counter-clockwise direction without such movement being impeded by the coupling element 14 of the upper clutch.

It will be understood that each of the elements described above, or two or more together, may also find a useful application in other types of devices for tightening and loosening of screws or the like differing from the types described above.

While the invention has been illustrated and described as embodied in a device for tightening and loosening of screws or the like, it is not intended to be limited to the details shown, since various modifications and structural changes may be made without departing in any way from the spirit of the present invention.

Evidently free-wheel couplings of a type different from the above described, such as for instance used in bicycles, may be used in the device according to the present invention. It is also possible to use claw couplings in connection with the device of the present invention which are constructed in such a manner that one part of the claw coupling is connected to the housing and the other to the spindle 7 in such a manner that during motor drive the claws of one coupling part will slide over the claw of the other coupling part while during manual turning of the housing the claws of the two coupling parts will engage with each other.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A power driven device for tightening and loosening screws or the like comprising, in combination, an elongated housing; a motor mounted in said housing and having a drive shaft; a spindle operatively connected at one end thereof to said drive shaft for rotations therewith and adapted to carry at the other end thereof a tool; and coupling means for coupling said spindle to said housing non-rotatable with respect thereto when said motor is at standstill and a tool carried by said spindle engages a screw or the like, said coupling means constructed and arranged to couple said spindle to said housing when said housing is turned in one direction in which a screw engaged by the tool is tightened and to uncouple said housing from said spindle during turning of said housing in a direction opposite to said one direction and also when said spindle is rotated by said motor in a direction in which a tool carried by said spindle is rotated in a screw tightening direction, whereby a screw engaged by the tool may first be driven in fast by rotating said spindle and said tool carried thereby by said motor and then the motor be stopped and the screw be tightened by manually turning said housing in said one direction.

2. A device as set forth in claim 1, wherein said coupling means comprises at least one free-wheel coupling.

3. A device as set forth in claim 1, and including switch means operatively connected to said motor for reversing direction of rotation of said motor and said spindle connected thereto, said coupling means including a pair of free-wheel couplings, one free wheeling during rotation of said spindle in one direction and the other free wheeling during rotation of said spindle in the opposite direction, said device including further connecting means operatively connecting said switch means to said free-wheel couplings for coupling during rotation of said motor in one direction one of said free-wheel couplings with said housing and during rotation of said motor in the opposite direction the other of said free-wheel couplings with said housing.

4. A device as set forth in claim 2, wherein said free-wheel coupling comprises a disc-shaped annular coupling member turnably mounted on said spindle and being formed at the inner peripheral thereof engaging said spindle with a plurality of elongated cut outs extending in circumferential direction and spaced from each other from said inner peripheral into said coupling member and each decreasing in width in a direction opposite to said one direction from one end of a selected maximum width to the opposite end of a selected minimum width, a rolling element in each of said cut outs and having a diameter smaller than said maximum width but greater than said minimum width, resilient means engaging each of said rolling elements and biased so as to tend to move the latter toward said opposite end of the respective cut out, and conecting means connecting said coupling element to said housing for preventing rotation of said coupling element relative to said housing.

5. A device as set forth in claim 4 and including switch means movable between two end positions and operatively connected to said motor so that the latter and said spindle connected thereto rotates in one direction when said switch means is in one end position and in the opposite direction when said switch means is in the other end position, wherein said coupling means includes a pair of free-wheel couplings, one free-wheeling during rotation of said spindle in one direction and the other free wheeling during rotation of said spindle in the opposite direction, said switch means being connected to said connecting means of the coupling element of each free-wheel coupling for preventing rotation of the coupling element of one coupling relative to said housing when said motor rotates in one direction and for preventing rotation of the coupling element of the other coupling when said motor rotates in the opposite direction.

6. A device as set forth in claim 5, wherein said connecting means include a ring surrounding said coupling members and movable in axial direction between a first and a second position, a first pair of cooperating engaging means respectively provided on the outer peripheral surface of said ring and on the inner surface of said housing for preventing turning said ring relative to said housing while permitting movement of said ring in axial direction, a first additional engaging means provided on the outer peripheral surface of each coupling element, and a second additional engaging means on the inner peripheral surface of said ring adapted to engage with either of said first additional engaging means on said coupling elements for preventing when engaged rotation of the respective coupling element relative to said ring, said ring being connected to said switch means to be movable in axial direction during movement of the latter between said end positions thereof so that in one end position of said switch means said second additional engaging means on said ring engages with said first additional engaging means of one of said coupling elements and so that in the other end position of said switch means said second additional engaging means is in engagement with said first additional engaging means of the other of said coupling elements.

7. A device as set forth in claim 6, wherein said switch means includes a switch member movable in axial direction of said spindle between said end positions, and including transmission means for connecting said switch member to said ring, said transmission means including an elongated slide member mounted in said housing movable in said axial direction and fixedly connected to said ring, said slide member being formed with an elongated cavity facing said switch member and extending in said axial direction, an elongated coil spring extending longitudinally through said cavity, and an operating member fixed to said switch member for moving therewith and projecting therefrom substantially normal to the direction of movement thereof between a pair of adjacent convolutions of said coil spring.

8. A device as set forth in claim 7, wherein said operating member comprises a U-shaped portion of an elongated leaf spring projecting substantially normal to and intermediate a pair of end portions of a leaf spring located substantially in a plane and being fixed to said switch member.

9. A device as set forth in claim 8, wherein said switch means further includes a pair of spaced contacts and a contact between said spaced contacts and selectively movable into contact with either of said spaced contacts, said switch member having a pair of arms extending opposite to each other in said axial direction, one arm engaging said movable contact to move the latter in one end position of said switch member into contact with one of said spaced contacts and in the other end position of said switch member into contact with the other of said spaced contacts.

10. A device as set forth in claim 9, wherein said housing is formed in a wall portion thereof with an elongated stepped opening extending in axial direction through which a portion of said switch member slidably extends, said opening decreasing in length in three steps from the inner to the outer surface of said housing and the lengths between opposite ends of said arms of said switch member being substantially equal to half of the length of the maximum step of the opening at the inner surface of said housing plus half the length of the opening of the intermediate step so that in each end position of said switch member the end of one arm may abut against one end face of the innermost step of said opening and the end of the other arm may abut against one end face of the intermediate step of said opening.

References Cited
UNITED STATES PATENTS

| | | | |
|---|---|---|---|
| 378,944 | 3/1888 | Vinton | 192—45 X |
| 2,719,447 | 10/1955 | Ford | 81—59.1 |
| 2,897,932 | 8/1959 | Morgan | 81—59.1 |

FOREIGN PATENTS

| | | |
|---|---|---|
| 395,861 | 10/1958 | France. |
| 941,370 | 7/1948 | France. |

WILLIAM W. DYER, JR., *Primary Examiner.*

R. J. ZLOTNIK, *Assistant Examiner.*